United States Patent
Danzig et al.

(10) Patent No.: US 7,359,468 B2
(45) Date of Patent: Apr. 15, 2008

(54) APPARATUS FOR SYNCHRONIZING CLOCK AND DATA BETWEEN TWO DOMAINS HAVING UNKNOWN BUT COHERENT PHASE

(75) Inventors: Joel Danzig, Alpharetta, GA (US); David R Dworkin, Alpharetta, GA (US); Gregory S Tow, Suwanee, GA (US); Robert J Hebert, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 571 days.

(21) Appl. No.: 10/295,825

(22) Filed: Nov. 18, 2002

(65) Prior Publication Data

US 2005/0074081 A1 Apr. 7, 2005

Related U.S. Application Data

(60) Provisional application No. 60/380,829, filed on May 17, 2002.

(51) Int. Cl.
*H04L 7/00* (2006.01)

(52) U.S. Cl. .............. 375/355; 375/375; 375/357; 375/371; 326/93; 326/94; 370/350; 370/516

(58) Field of Classification Search ............... 375/355, 375/375, 357, 371; 326/93, 94; 370/350, 370/516

See application file for complete search history.

(56) References Cited

U.S. PATENT DOCUMENTS

| 5,341,403 A | * | 8/1994 | Morley ................... 375/354 |
| 5,432,823 A | * | 7/1995 | Gasbarro et al. ........... 375/356 |
| 5,764,710 A | * | 6/1998 | Cheng et al. ............. 375/371 |

\* cited by examiner

*Primary Examiner*—David C. Payne
*Assistant Examiner*—Nader Bolourchi
(74) *Attorney, Agent, or Firm*—Sterne, Kessler, Goldstein & Fox, P.L.L.C.

(57) ABSTRACT

A data synchronizer is provided for synchronizing data across two different clock domains in a manner that avoids additive jitter. The data synchronizer includes a synchronizer inputting a sampling clock and a data clock, and outputting an edge pulse. A synchronizer jitter lockout circuit inputs the edge pulse and the sampling clock and outputs a data sampling enable signal which never coincides with a data transition.

16 Claims, 3 Drawing Sheets

APPARATUS FOR SYNCHRONIZING CLOCK AND DATA BETWEEN TWO DOMAINS HAVING UNKNOWN BUT COHERENT PHASE

CROSS-REFERENCE TO RELATED APPLICATIONS

This application claims priority to commonly assigned U.S. Provisional Patent Application No. 60/380,829, filed on May 17, 2002.

BACKGROUND OF THE INVENTION

1. Field of the Invention

The present invention relates to sampling of data signals in a transmission system, and more particularly, to sampling data to ensure that a meta-stable condition is avoided.

2. Related Art

Many applications require synchronization of data across two different clock domains. Conventional art uses simple resample techniques that employ registering a lower frequency clock signal using a higher frequency clock signal. A logical combination of final output stages generates an edge that is synchronous with either the rising or falling edge of the faster clock. In this way, the edge can be used to enable the transfer of data from the slower clock domain to the faster clock domain. This prevents data from being sampled at a time coincident with the time when the data is changing. Use of this technique prevents what is called a meta-stable condition. An unavoidable side effect of this type of data synchronization is an additive "jitter" or sample uncertainty equal to one period of the faster sample clock.

In one embodiment of a standard DOCSIS application, the master clock is typically 163.84 MHz. This clock is often used to generate other clocks for other purposes. Specifically, the master clock of 163.84 MHz is divided by 2 to generate a 81.92 MHz clock used for sampling data. It is also divided by 8 to generate a 10.24 MHz data clock. Thus, one clock reference (163.48 MHz) is used to generate multiple synchronous clocks (81.92 MHz, 10.24 MHz).

However, a particular problem arises in that as between a transmitter and a receiver, even though the frequencies of the clocks are known, the phase relationship between the data sampling clock (hereafter referred to as CLK2) and the data clock (hereafter referred to CLK1) is often unknown. Thus, while the two time domains have clocks in a coherent relationship with each other, their phase relationship is not known. This can give rise to a condition known as meta-stability. If a receiver tries to sample the data stream on a data transition, the value of the data at the transition point is undefined. This can result in a loss of data and loss of synchronization, which is unacceptable in a transmission system such as an SCDMA transmission system.

When two coherent clock sources are used, the problem of additive "jitter" can be avoided if the phase relationship between the two coherent clock sources is known. If the phase relationship is not known—or cannot be predicted with certainty—then the problem of synchronizing data from the slower clock domain to the faster clock domain must take into account the possibility of a meta-stable sampling of data. When designing for this scenario, then, "jitter" is also a possibility due the unknown phase relationship between the clocks.

SUMMARY OF THE INVENTION

The present invention is directed to a method and apparatus for synchronizing clock and data between two time domains that substantially obviates one or more of the problems and disadvantages of the related art.

There is provided a data synchronizer including a synchronizer inputting a sampling clock and a data clock, and outputting a data clock edge pulse. A synchronizer jitter lockout circuit inputting the data clock edge pulse and the sampling clock is also provided, wherein the synchronizer jitter lockout circuit outputs a data sampling enable signal which never coincides with a period in time when data transitions.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

This invention provides a solution to the problem of synchronizing data between two phase coherent, but unknown, clock domains. A counting mechanism guarantees that samples are obtained at exactly the same interval. This reduces the "jitter" due to synchronization to zero.

Figure 1:
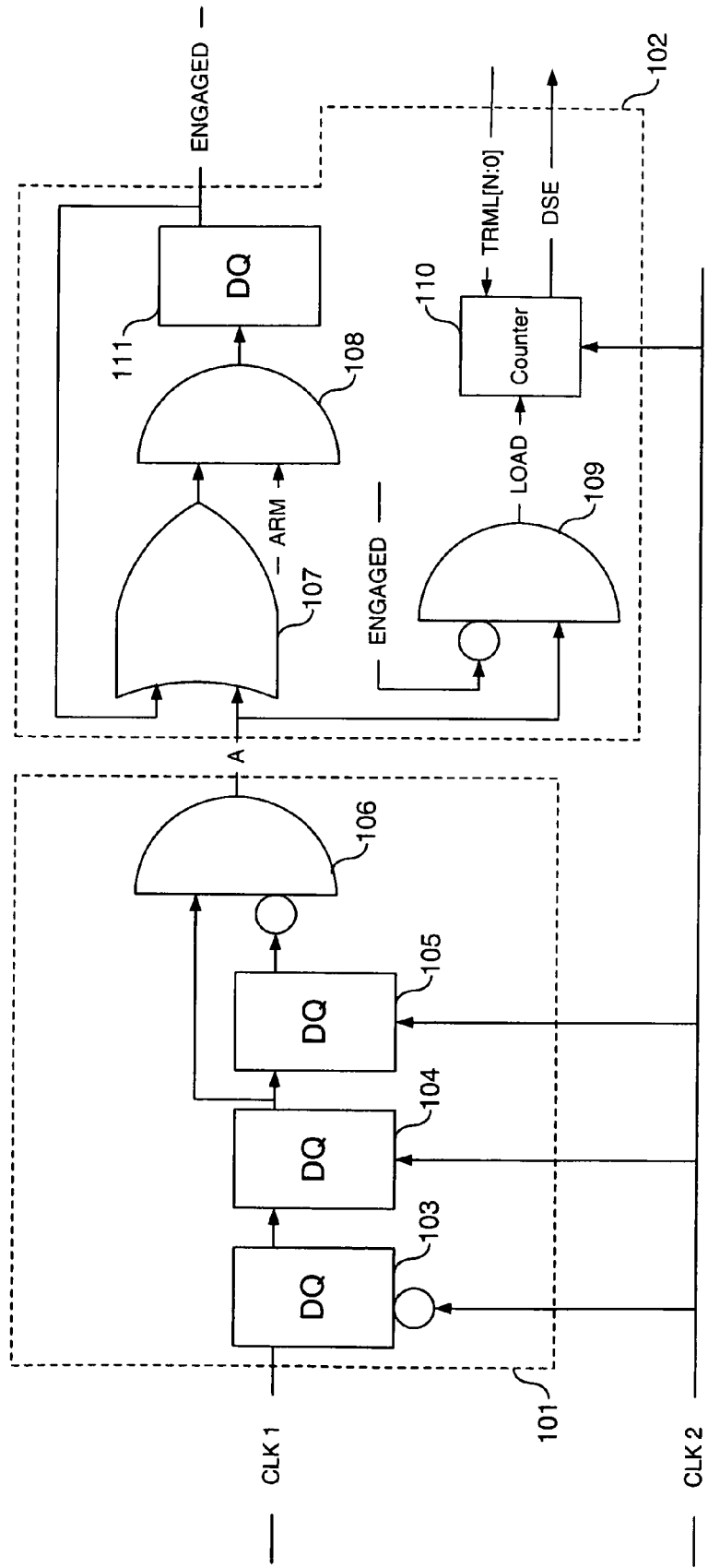
FIG. 1 illustrates a synchronization circuit of one embodiment of the present invention.

With reference to FIG. 1, a sychronizer 101 takes as inputs CLK2 and CLK1, whose phase relationship may be unknown. The synchronizer 101 includes three DQ flip flops 103, 104, and 105 connected in series as shown. The clock input to all three DQ flip flops 103-105 is the data sampling clock CLK2. The flip flops 103, 104 105 resample CLK1 using CLK2. Through an AND gate 106, a pulse edge (sync) signal A is outputted. The pulse edge signal A represents a detection of a clock edge. A synchronizer jitter lockout circuit 102, also known as a synchronous clock enabler, is driven by the output of the synchronizer 101 and the data sampling clock CLK2. The lockout circuit 102 includes an OR gate 107, an AND gate 108, and a DQ flip flop 111, connected as shown as FIG. 1. The DQ flip flop 111 outputs an ENGAGED signal. The ENGAGED signal and the pulse edge signal A from the synchronizer 101 are inputted into an AND gate 109, which outputs a LOAD signal into a counter 110. The counter 110 is a down or up counter. (Note that DQ103 can use either positive or negative edge trigger on it and the AND gate106 can have the inversion bubble on the output of DQ 104 rather than DQ 105 which will generate a pulse A on the falling edge of CLK2 rather than the rising edge. In other words, alternative implementations for generation of pulse edge signal A are possible.)

When TRML[N:0] value is reached, the data sample enable (DSE) signal is generated synchronous to CLK2. TRML[N:0] is therefore the terminal count to be loaded upon system configuration. This allows the circuit 102 to be configured for multiple CLK1 frequencies. The counter 110 loads a value of the TRML signal on the LOAD signal. The LOAD signal is such that when ENGAGED is LOW, the LOAD pulse is generated (edge A is passed to circuit 102). When ENGAGED is HIGH, the LOAD pulse is not generated (i.e., edge A is not passed to circuit 102).

The counter 110 outputs the data sampling enable (DSE) signal. An ARM signal is provided from an external source, typically from a software loaded register. In other words, ARM is set via static register setting. It transitions synchronous to CLK2. It essentially performs a "lock", "unlock" function of the circuit 102. Thus, the pulse edge signal A is used to load the counter 110. If the ARM signal is low(zero) when the pulses are detected at A, then each pulse detected at A will serve to reset the counter (110) and thus a unique DSE signal will be generated that is related to the pulse A which preceded it. If the ARM signal is high(one) when a pulse is detected at A, then the same pulse detected at A will serve to generate the ENGAGED signal(one), which will then disable the counter(110) from receiving the LOAD signal again. The counter(110) will be prevented from receiving the load signal until the ARM signal is brought low(zero) again. When the ARM signal is turned on, then the next pulse detected at A will serve to lock the counter 110 to the phase of the data and then lock out (prevent) LOAD from being asserted again.

Once the system is stabilized, the clocks CLK1, CLK2 are locked, and the system is ready to capture data. The ARM signal is high.

Thus, the order of events is:
1: system initializes and CLK 1 and CLK2 are considered stable
2: ARM=1
3: Next Load pulse locks phase of counter 110
4: data is sampled correctly.

For a system having a data clock that is four times slower than the sampling clock, the counter 118 is a two-bit counter that counts from 0-3. When the ARM signal is LOW, on every pulse, the counter 110 is loaded with the value of the TRML [N:0] signal. When the ARM signal goes HIGH, the system will sample the data stream at exactly the same point going forward, ignoring the output of the synchronizer 101. The DSE signal represents an indication that a clock edge has been received, and that it is now safe to sample data without a risk of encountering a meta-stable condition.

When the ENGAGED signal goes high, the load function of the counter 110 is locked out, and the counter 110 runs automatically as a timer. In other words, when ARM=HIGH, ENGAGED is set by detection of first edge A, when ARM=LOW, ENGAGED is cleared.

Thus, with a circuit of the present invention, it doesn't matter what the phase relationship is between the sampling clock CLK2 and the data clock CLK1. As long as one edge is detected (and the ARM signal goes high), that edge can be used going forward to define the phase relationship between the two clocks CLK1, CLK2.

Thus, the LOAD signal for the counter 110 is generated for every rising (or falling) edge of CLK1 until ARM is asserted. Once ARM is asserted, the LOAD signal will be generated once more for the final time. LOAD is prevented from being generated again until ARM is de-asserted at the right moment, on the ARM signal going high, and only one per ARM cycle. The edge signal A tells the counter 110 to reset, were it not for the remainder of the circuit 102.

With the circuit as illustrated in FIG. 1, every fourth cycle of CLK2, data is sampled.

Thus, the circuit shown as 102 in FIG. 1 prevents a risk of meta-stability when sampling data, and provides an enabling pulse for sampling the data at a time such that the meta-stable condition is guaranteed not to occur. In other words, for two signals that are coherent but whose phase relationship is unknown, the circuit of FIG. 1 guarantees that there is no jitter (no meta-stability) during data sampling.

Figure 2:
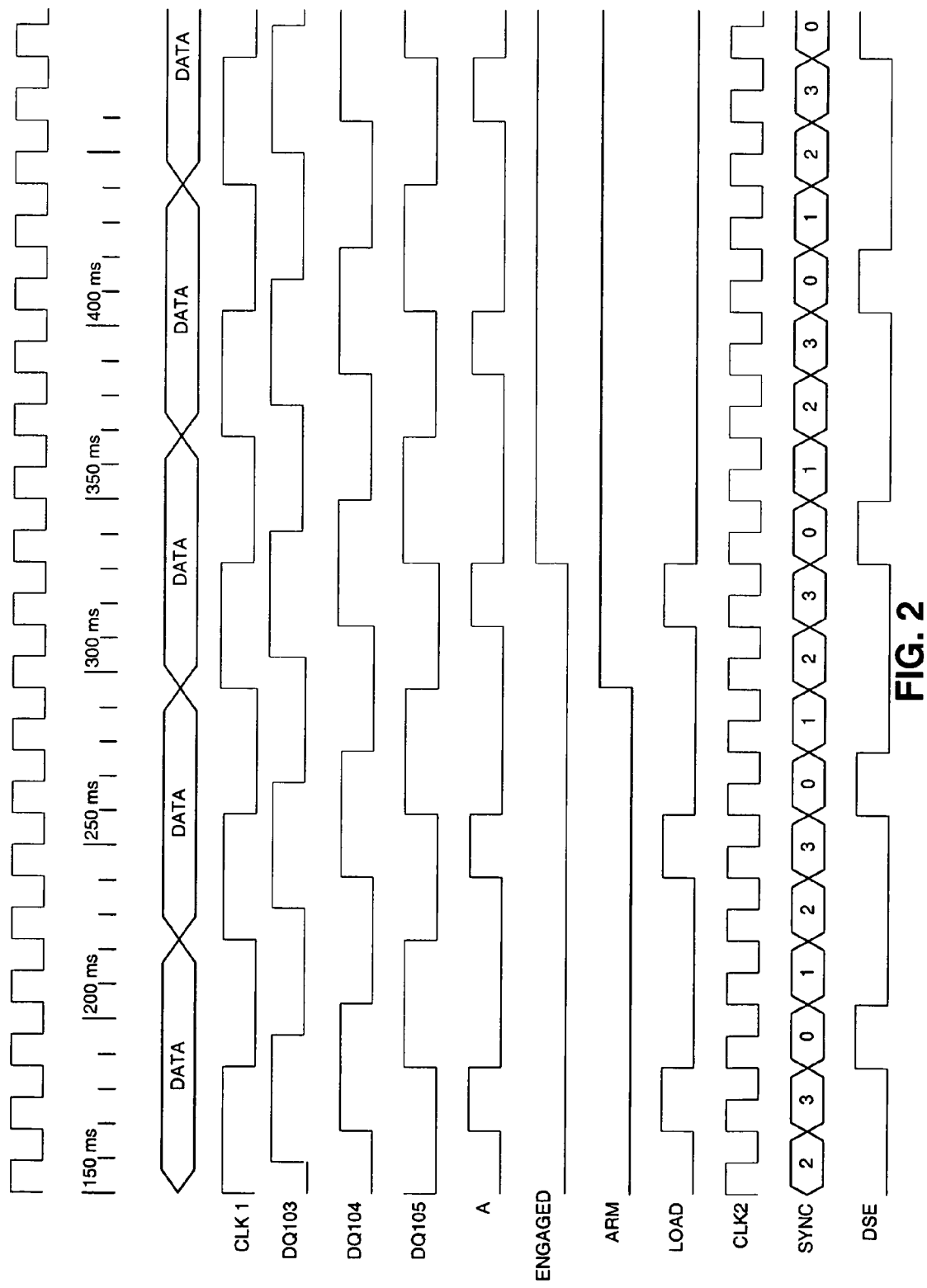
FIG. 2 illustrates a timing diagram for the circuit of FIG. 1.

FIG. 2 shows a timing diagram for the circuit of the present invention. As shown in FIG. 2, the clock CLK2 is running at 4 times the rate of clock CLK1, however, their phase relationship may be undefined. DQ 103, DQ 104 and DQ 105 show the outputs of the DQ flip flops (registers) 103, 104 and 105. The edge signal A is shown as going HIGH once every 4 cycles of the data sampling clock CLK2. Data transitions on the rising edge of the CLK1, the data clock. The counter 110 is running on the sampling clock CLK2, counting from 0 to 3 in a cyclical manner. Once the ARM signal goes HIGH, the ENGAGED signal goes HIGH on the next falling edge of the A signal from the synchronizer 101. From that point forward, the data sampling enable (DSE) signal is synchronized with the data such that it will never transition at a time when data transitions. Thus, from that point forward, the counter 110 outputs the data sample enable (DSE) signal to indicate that it is safe to sample the data without a risk of a meta-stable condition.

ARM is set via static register setting. It transitions synchronous to CLK2. It essentially performs a "lock", "unlock" function of the circuit 102.

Note that DSE can be moved or altered depending on load, which depends on the edge pulse A. DSE is subject to a one cycle shift (jitter) should the edge pulse A shift because of a meta-stable sampling of CLK2. Once ARM=HIGH, DSE is no longer dependent on LOAD, hence meta-stable errors are eliminated.

The counting circuit includes a terminal count value which is equal to the number of cycle differences between the two clock frequencies. So for example if the data clock CLK1 is 20.48 MHz and the data sampling clock CLK2 is 81.92 MHz, the terminal count value is 4. When the first synchronization edge A is detected, the counter 110 is pulsed to begin counting using the same clock as the synchronizer 101. When the terminal count is reached, an edge is generated which is used to move the data from the 20.48 MHz domain to the 81.92 MHz domain. The original edge A detected by the synchronizer is ignored after the first (initial) edge. In this way, the data is moved from 20.48 MHz to the 81.92 MHz domain at the exact same position relative to the 20.48 MHz domain and at the exact same position relative to the 81.92 MHz domain (that is, at the same count).

This is an improvement to conventional techniques which offers no solution to the problem of using synchronous data transfer between coherent clock domains of unknown phase without introducing "jitter".

The advantage to using this invention is being able to run real-time DSP functions utilizing every clock cycle without sampling errors due to synchronization jitter. Without it, higher sampling frequencies, and/or buffering, might have to be used to account for sample error correction.

Figure 3:
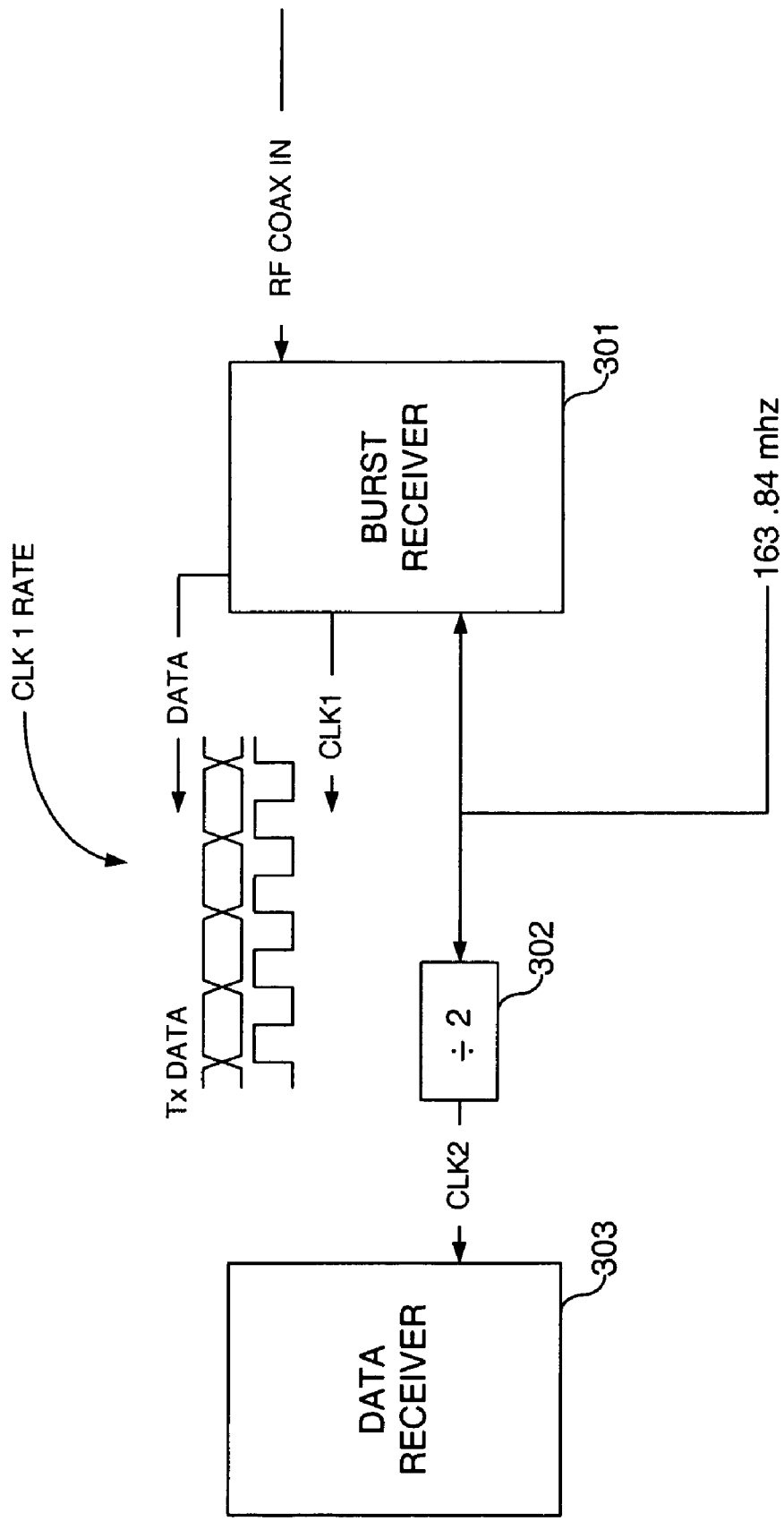
FIG. 3 illustrates a system block diagram where the circuit of FIG. 1 is used.

FIG. 3 shows a block diagram of the overall system. As shown in FIG. 3, a high speed master clock of 163.84 MHz is inputted into a burst receiver 301 and a divide by 2 clock divider 302. The clock divider 302 outputs 81.92 MHz (CLK2) into a data receiver 303. The burst receiver 301, which includes the circuit shown in FIG. 1, outputs CLK1, the data clock CLK2, and also outputs data synchronized to the CLK1 rate.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A data synchronizer comprising:
   a synchronizer inputting a sampling clock and a data clock, and outputting an edge pulse; and
   a synchronizer jitter lockout circuit inputting the edge pulse and the sampling clock, wherein the synchronizer jitter lockout circuit further includes a register latching an external lock signal and the edge pulse, and outputting an ENGAGED signal,
   wherein the synchronizer jitter lockout circuit outputs a data sampling enable signal which never coincides with a data transition.

2. The data synchronizer of claim 1, wherein the counter is triggered by a LOAD signal generated from ANDing the edge pulse and the ENGAGED signal.

3. The data synchronizer of claim 2, wherein the synchronizer jitter lockout circuit includes a counter triggered by the edge pulse, wherein the counter is reset by the LOAD signal.

4. A data synchronizer for synchronizing data across two different clock domains, comprising:
   a synchronizer inputting a sampling clock and a data clock, and outputting a sync pulse; and
   a synchronous clock enabler inputting the sync pulse and the sampling clock, wherein the synchronous clock enabler further includes a register latching an external lock signal and the sync pulse, and outputting an ENGAGED signal,
   wherein the synchronous clock enabler ensures that data is never sampled when a metastable condition can occur.

5. The data synchronizer of claim 4, wherein a counter, triggered by the sync pulse, is triggered by a LOAD signal generated from ANDing the sync pulse and the ENGAGED signal.

6. The data synchronizer of claim 5, wherein the counter is reset by the LOAD signal.

7. A data synchronizer comprising:
   a synchronizer inputting a sampling clock and a data clock, and outputting an edge pulse; and
   a synchronizer jitter lockout circuit inputting the edge pulse and the sampling clock
   wherein the synchronizer jitter lockout circuit includes a counter triggered by the edge pulse, and
   wherein the synchronizer jitter lockout circuit outputs a data sampling enable signal.

8. The data synchronizer of claim 7, wherein the synchronizer jitter lockout circuit further includes a register latching an external lock signal and the edge pulse, and outputting an ENGAGED signal.

9. The data synchronizer of claim 8, wherein the counter is triggered by a LOAD signal generated from ANDing the edge pulse and the ENGAGED signal.

10. The data synchronizer of claim 9, wherein the counter is reset by the LOAD signal.

11. A data synchronizer comprising:
    a synchronizer inputting a sampling clock and a data clock, and outputting a sync pulse; and
    a synchronous clock enabler inputting the sync pulse and the sampling clock,
    wherein the synchronous clock enabler includes a counter triggered by the sync pulse, and
    wherein the synchronous clock enabler ensures that data is never sampled when a metastable condition can occur.

12. The data synchronizer of claim 11, wherein the synchronous clock enabler further includes a register latching an external lock signal and the sync pulse, and outputting an ENGAGED signal.

13. The data synchronizer of claim 12, wherein a counter, triggered by the sync pulse, is triggered by a LOAD signal generated from ANDing the sync pulse and the ENGAGED signal.

14. The data synchronizer of claim 13, wherein the counter is reset by the LOAD signal.

15. A data synchronizer comprising:
    a synchronizer inputting a sampling clock and a data clock, and outputting an edge pulse; and
    a synchronizer jitter lockout circuit inputting the edge pulse and the sampling clock,
    wherein the synchronizer jitter lockout circuit outputs a data sampling enable signal which never coincides with a data transition, and
    wherein once a particular edge pulse is selected, subsequent edge pulses are ignored by the synchronizer jitter lockout circuit.

16. A data synchronizer for synchronizing data across two different clock domains, comprising:
    a synchronizer inputting a sampling clock and a data clock, and outputting a sync pulse,
    wherein once a particular sync pulse is selected, subsequent sync pulses are ignored by the synchronous clock enabler; and
    a synchronous clock enabler inputting the sync pulse and the sampling clock,
    wherein the synchronous clock enabler ensures that data is never sampled when a metastable condition can occur.

* * * * *